Jan. 12, 1960     K. GAROFF     2,921,185
WAVE GUIDE DUPLEXING SYSTEM
Filed July 2, 1954     4 Sheets-Sheet 1

*INVENTOR,*
*KENTON GAROFF.*

BY *Harry M. Saragovitz*

*ATTORNEY.*

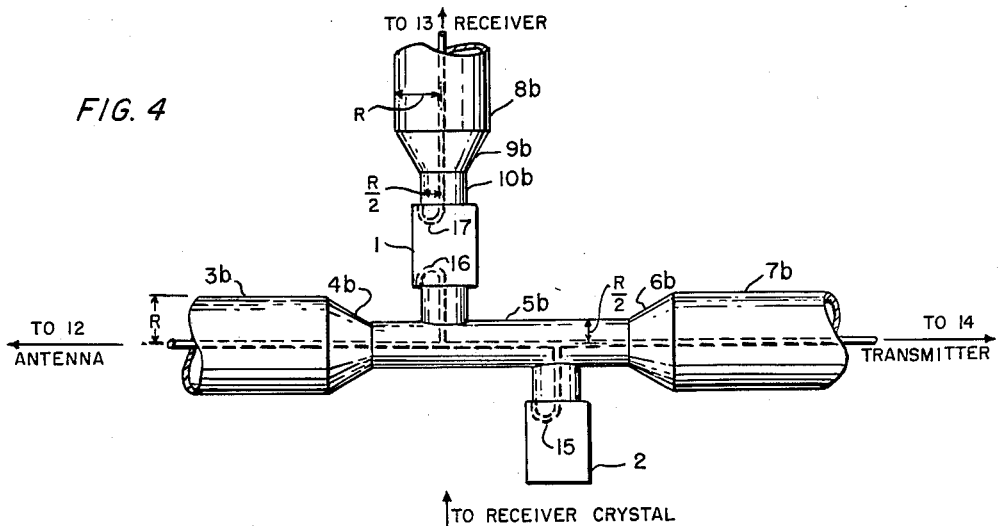
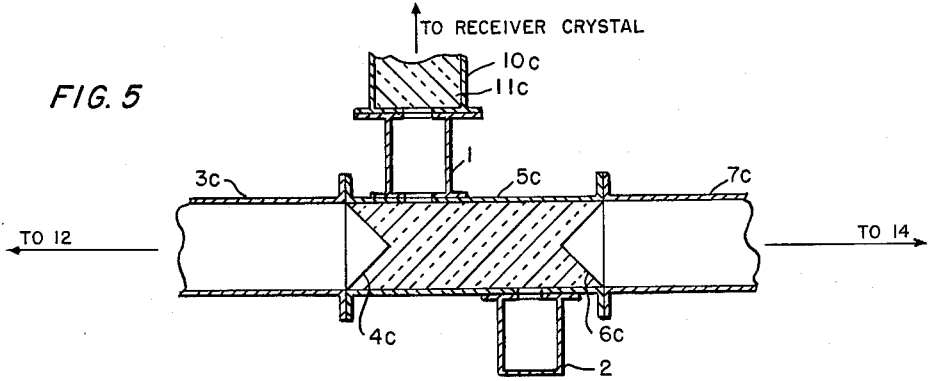
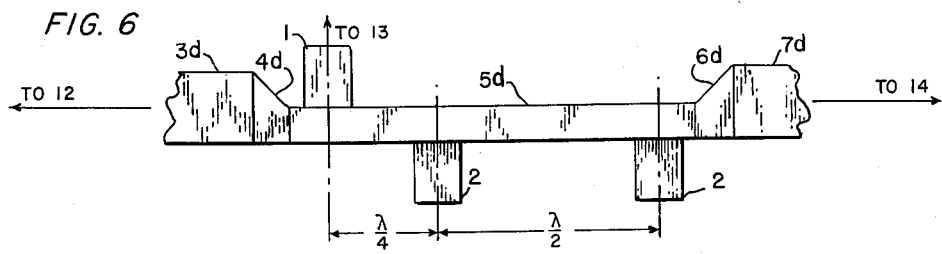
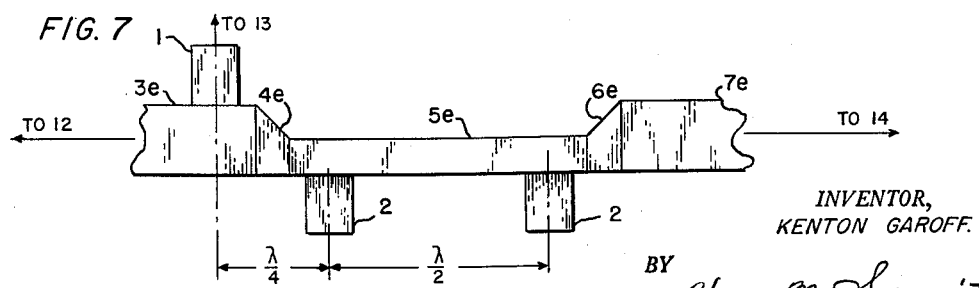

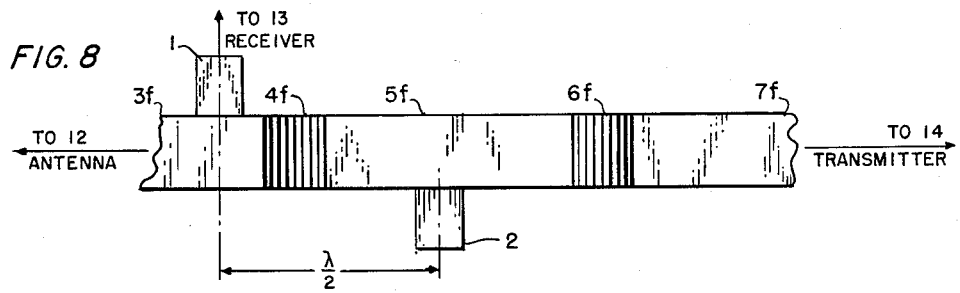
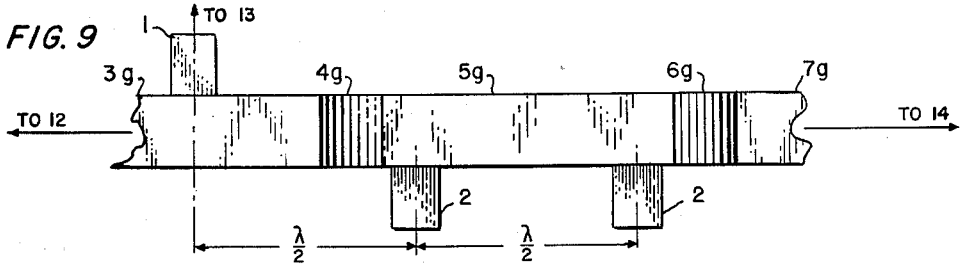
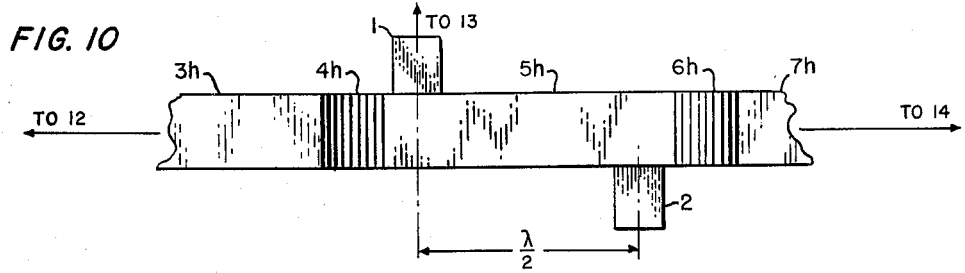
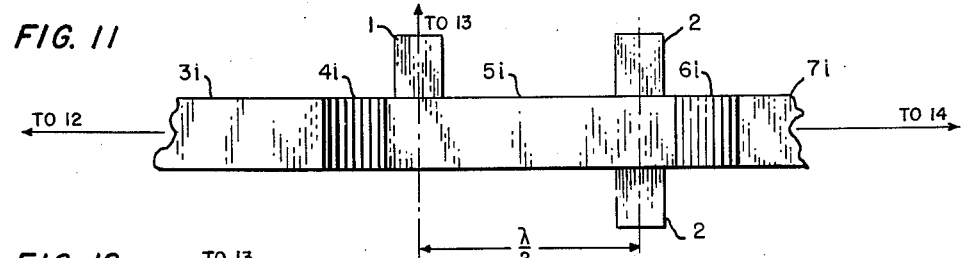
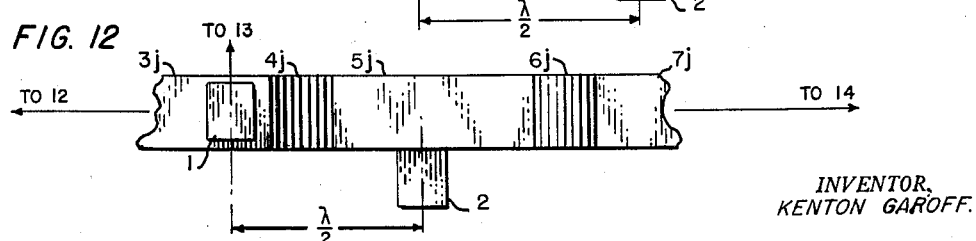

*INVENTOR,*
*KENTON GAROFF.*

United States Patent Office 2,921,185
Patented Jan. 12, 1960

2,921,185

WAVE GUIDE DUPLEXING SYSTEM

Kenton Garoff, Little Silver, N.J., assignor to the United States of America as represented by the Secretary of the Army Application July 2, 1954, Serial No. 441,187

9 Claims. (Cl. 250—13)

(Granted under Title 35, U.S. Code (1952), sec. 266)

The invention described herein may be manufactured and used by or for the Government for governmental purposes, without the payment of any royalty thereon.

This invention relates to an improved electrical transmission duplexing system for use in radar and similar two-way radio signal pulse communication systems utilizing a common transmitting and receiving antenna, and more particularly to a coupling arrangement for so-called TR (transmit-receive) tubes and ATR (anti-transmit-receive) tubes employed for switching purposes in such a system.

For purposes of discussion, the TR and ATR tubes herein considered will be of the resonant-cavity, gas-filled discharge tube switch type adapted to be short-circuited by discharge in the gas therein in response to the applied high-power transmitted signal pulses of the resonant frequency during signal transmitting intervals, commonly employed in duplexing systems of radar sets. Such duplexing tubes referred to by those abbreviated terms are broadly described on pages 4 to 7 of the book entitled, "Microwave Duplexers" by Smullin and Montgomery, which is volume 14 of the M.I.T. Radiation Laboratory Series, published in 1948, and is considered the basic reference book on the subject.

The function of the duplexing system of a radar set is to couple the transmitted signal from the radio-frequency (R–F) generator to the antenna while protecting the sensitive receiver from the high power pulse of the R–F generator, and to couple the returning echo from the antenna to the receiver. The conventional duplexing system utilizes the TR tube and the ATR tube to perform this function. The primary purpose of the TR tube is to protect the receiver, while that of the ATR tube is to direct the returned echo signal to the receiver.

In conventional duplex systems it is difficult to utilize the full bandwidth of the TR tube because of the edge-band branching losses introduced by the ATR tube and its associated circuitry. The edge-band branching loss is defined as the power loss in transmission of the echo signal from the antenna to the receiver, assuming no loss due to the antenna, the TR tube, or the receiver. In order to reduce the edge-band branching losses, it is common practice to use two or more ATR tubes in the line connection between the transmitter and the TR tube, either opposite each other or one-half wavelength apart. This reduces the edge-band branching losses and thus increases the effective bandwidth of the transmission system.

Conventional ATR tubes consist of a gas filled, shorted, quarter-wavelength stub series mounted on the main transmission line between the transmitter and the receiver and coupled to the line by a resonant glass window.

In present TR and ATR tubes the resonant elements of the tubes are high Q elements and are loaded by the characteristic impedance of the transmission line to which they are coupled. The operating bandwidth of the resonant element will be increased as the loaded Q, designated $Q_L$, of the resonant element is decreased, which results from decreasing the characteristic impedance of the transmission line. The present invention makes use of this factor by transforming the normal characteristic impedance of the transmission line to a lower characteristic impedance. In the case of a wave guide, this would be done by use of a reduced height section for the waveguide line or any other suitable means, associated with the ATR tube, thus decreasing the $Q_L$ of the resonant elements and increasing the bandwidth of the transmission system.

It is an object of this invention to increase the operating bandwidth of the duplexing means of pulse transmission and receiving systems.

It is a further object of this invention to reduce the number of ATR tubes required in a duplexing system for a given bandwidth.

It is a further object of the invention to obtain a broader operating bandwidth for a TR tube.

These and other objects of the invention will be more apparent from the following description and claims.

In accordance with this invention the above objects are obtained by coupling the ATR tube, or both the TR and the ATR tubes, of the duplexing system to a transmission line which has its characteristic impedance reduced for a section of its length.

For a more detailed description of the invention, reference is made to the accompanying drawings forming a part of this specification, in which like numerals are employed to designate like parts, and in which:

Figure 4 is an embodiment of the invention applied to a coaxial cable transmission system;

Figure 5 is a cross sectional view of an embodiment of the invention utilizing a dielectric filled waveguide section; and Figures 6 through 15 are diagrammatic views showing various modified arrangements of the TR and ATR tubes in connection with the present invention.

Figure 1:
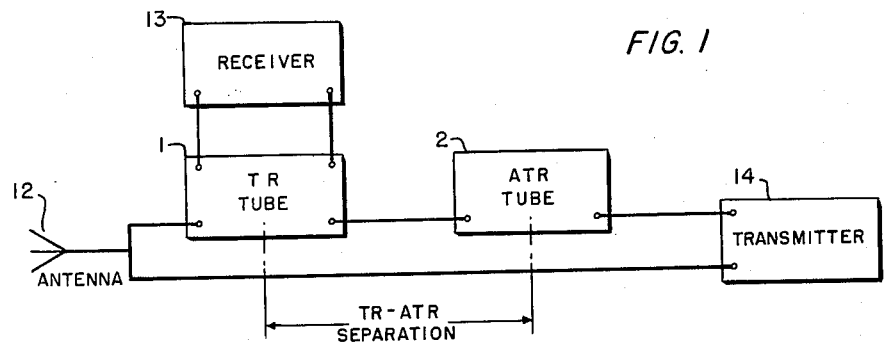
Figure 1 is a block diagram of a conventional duplexing system.

Figure 1 is a block diagram of a conventional type of duplexing means for a radar system. The high power transmitted pulses from the R–F generator of the transmitter 14 causes an R–F discharge in the gas filled resonant cavities of the TR tube 1 and ATR tube 2, effectively shorting them out and allowing power to be propagated to the antenna 12. During the receive portion of the operating cycle the impedance seen by the antenna at the reference plane of the TR tube will be the equivalent lumped impedance of the TR tube and its circuit, and the transformed equivalent lumped impedance of the ATR tube and inactive transmitter. These impedances are expressed as follows: The TR tube and its connecting circuit to the receiver are expressed as $Zo+R'+jX'$, where $Zo$ is the characteristic impedance of the transmission section connecting the TR tube to the receiver, and $R'+jX'$ is the impedance of the TR tube; the equivalent impedance of the ATR tube is expressed by $R+jX$; and the impedance of the transmitter at the ATR reference plane is $Zm$.

When set out in equation form wherein the TR tube and accompanying circuit are expressed as admittances, and all terms are normalized, the equation is $$\frac{Zin}{Zo} = \frac{Yo}{Yo+G'+jB'} + \frac{Zo}{Zm+R+jX}$$

where $G'$ is considered to be much smaller than $Yo$.

At the resonant frequency $X=B'=0$. The TR–ATR separation at this resonant frequency is exactly an odd multiple of $$\frac{\lambda g}{4}$$

where $\lambda g$ is the transmission system wavelength. R is the high impedance of the shorted, quarter-wavelength stub which constitutes the ATR tube body, shunted by the small conductance of the ATR window.

$$\frac{R}{Zo} \gg \frac{Zm}{Zo} \gg 1$$

and therefore $$\frac{Zin}{Zo}$$

is nearly unity, which corresponds to complete power transfer to the receiver. The frequency dependence of X, B', and the TR-ATR separation serves to limit the bandwidth of the duplexer.

When considering the definition of edge-band branching losses as given above, it will be seen that the first term of the above equation for $$\frac{Zin}{Zo}$$

is unity, and the branching loss is then a function of the second term which is the impedance at the reference plane of the TR tube due to the ATR tube and the transmitter. Considering the second term, it is evident that the edge-band branching loss can be decreased by increasing $$\frac{R+jX}{Zo}$$

which is equivalent to using more than one ATR tube in series, or by decreasing Zo, which is done in this invention.

Figure 2:
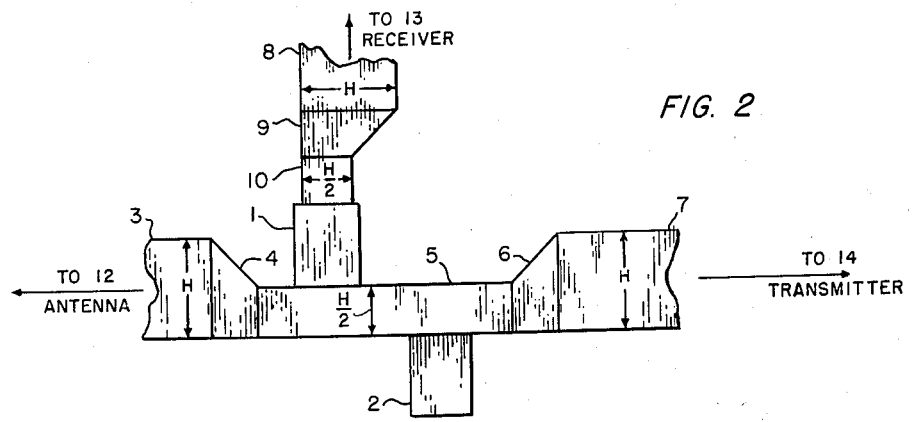
Figures 2 and 3 are diagrammatic views of two embodiments of the present invention as applied to waveguide transmission systems.

In Figure 2, which illustrates one embodiment of the invention, TR tube 1 and ATR tube 2 are employed as resonant elements. A rectangular waveguide circuit comprising sections 3, 4, 5, 6 and 7 in tandem couple the output of transmitter 14 to the antenna 12. A waveguide branch, comprising sections 3, 4, a portion of 5, 10, 9 and 8 in series with TR tube 1, couples the antenna 12 to the receiver 13. ATR tube 2 is coupled to section 5, and TR tube 1 is coupled between sections 5 and 10. Section 4 is a tapered transition section which provides proper impedance transformation between sections 3 and 5, as is 6 between 5 and 7, and as is 9 between 8 and 10. Sections 3, 7 and 8 have a height dimension, i.e., the narrow dimension of the waveguide, represented by H, which determines the characteristic impedance Zo of these sections of the waveguide transmission line. Sections 5 and 10 have reduced height dimensions $$\frac{H}{2}$$

determining the characteristic impedance $$\frac{Zo}{2}$$

for these sections. In the above discussion it is understood that the wide dimension of the waveguide remains constant. If it is also desired to increase the bandwidth of the mixer (not shown) of receiver 14, this may be accomplished by a slight variation of the arrangement of Figure 2. Sections 8 and 9 are eliminated, and the reduced height section 10 is extended to enable the mixer also to be coupled to reduced height section. This arrangement will provide an increased bandwidth for the mixer as well as for the duplexer.

Since the characteristic impedances of sections 5 and 10 are reduced to $$\frac{Zo}{2}$$

the $Q_L$ of the TR and ATR tubes coupled thereto will also be reduced by ½ of their value if coupled to the full height section. The operating bandwidth being an inverse function of $Q_L$, the bandwidth is effectively doubled. Of course the reduction of characteristic impedance of sections 5 and 10 from their normal waveguide values may be by any suitable amount, depending upon the bandwidth increase required, and the 50% reduction is given as an example of a suitable construction. The waveguide height may be reduced by any amount so long as sparkover does not occur in the reduced height section. Therefore, the maximum reduction which is possible for any particular system will depend upon the power level of that transmission system. Also TR tube 1 and ATR tube 2 are shown as series mounted on the waveguide section 5, but they may have shunt or a combination of series-shunt mountings if so desired.

Figure 3:
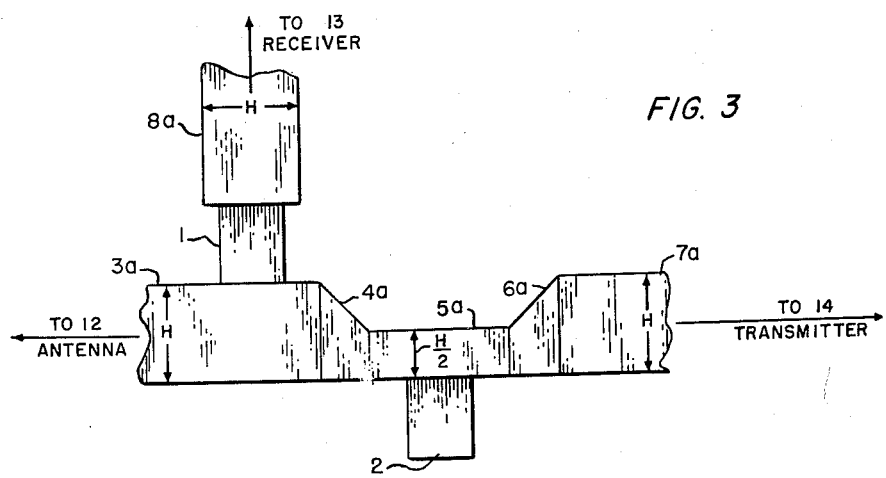

In Figure 3, a rectangular waveguide circuit comprising sections $3_a$, $4_a$, $5_a$, $6_a$ and $7_a$, couples the output of transmitter 14 to antenna 12. A waveguide branch comprising a portion of section $3_a$ and $8_a$ in series with TR tube 1 couple the antenna 12 to the receiver 13. ATR tube 2 is coupled to section $5_a$, and TR tube 1 is coupled between sections $3_a$ and $8_a$. Section $4_a$ is a tapered transition section which provides proper impedance transformation between sections $3_a$ and $5_a$, as is section $6_a$ between sections $5_a$ and $7_a$. Sections $3_a$, $7_a$ and $8_a$ have height dimensions represented by H which determines the characteristic impedance Zo of those sections of the waveguide transmission line. Section $5_a$ has a reduced height dimension $$\frac{H}{2}$$

to provide the characteristic impedance $$\frac{Zo}{2}$$

for that section. The width and height dimensions of the waveguide will be governed by the considerations mentioned above.

Thus the loading of the resonant element of TR tube 1 by waveguide section $3_a$ will remain at normal Zo, but that of ATR tube 2 by waveguide section $5_a$ having the reduced height dimension, will be reduced to $$\frac{Zo}{2}$$

and the bandwidth will be doubled for the same reasons heretofore described. The arrangement of Figure 3 is significant in that in many duplexing systems the ATR tube is the bandwidth limiting portion of the circuit, the TR tube normally having a much wider operating frequency range.

The duplexing system of Figure 4 is similar to that of Fig. 2 but sections of coaxial transmission cable are substituted for the waveguide transmission line sections of Figure 2. One coaxial circuit comprising sections $3_b$, $4_b$, $5_b$, $6_b$ and $7_b$ couples the output of transmitter 14 to antenna 12. A coaxial branch comprising sections $3_b$, $4_b$, a portion of $5_b$, $8_b$, $9_b$ and $10_b$ in series with TR tube 1 couples antenna 12 to the receiver 13. ATR tube 2 is coupled to section $5_b$ by coupling loop 15, and TR tube 1 is coupled between section $5_b$ and section $10_b$ by coupling loops 16 and 17 respectively. Section $4_b$ is a transition section which provides proper impedance transformation between sections $3_b$ and $5_b$, as is section $6_b$ between sections $5_b$ and $7_b$, and as is section $9_b$ between sections $8_b$ and $10_b$. The ratio of the diameter of the outer conductor to the diameter of the inner conductor determines the characteristic impedance of the coaxial cable. By making the diameter of the inner conductors constant, and making the radius of the outer conductors of section $5_b$ half that of sections $3_b$ and $7_b$, then the characteristic impedance of section $5_b$ will be half that of sections $3_b$ and $7_b$. As stated before, the reduction of $Z_o$ to $$\frac{Z_o}{2}$$

is an example of a suitable amount for purposes of description.

The TR-ATR separation at resonance is always either an odd multiple of $$\frac{\gamma g}{4}$$

for the series type TR-ATR mountings shown in Figures 1, 2, 3 and 4, or an integral multiple of $$\frac{\gamma g}{2}$$

for the shunt type mount and the series-shunt combination type mount. Greater TR-ATR separations are more frequency sensitive. In the case of the waveguide type of ATR mount, since the characteristic impedances of the other system components, such as the magnetron oscillator, antenna, and TR tube, are fixed by other considerations, it would generally be more desirable to have only the section of waveguide on which the ATR is mounted reduced in height, as shown in Figure 3. This will necessitate the use of transitions $4_a$ and $6_a$ connecting the half-height waveguide section to the waveguide sections of normal height. One of these transitions, therefore, would be positioned between the TR and ATR tubes.

The use of transition sections which allow the minimum TR-ATR separation, which gives the greatest bandwidth, presents difficulties in the operation of the system, and to eliminate these by increasing the length of the transistion section will result in a sacrifice of bandwidth. One method of overcoming this difficulty is to design a special short broadband transistion from the standard impedance waveguide. Another method of overcoming the difficulty is to also place the TR tube on the reduced height section as in Figures 2 and 4, where there is no difficulty in obtaining the desired TR-ATR separation.

When the TR and ATR tubes are used on the reduced height section the ATR tube will have to be retuned to resonant at the desired frequency while the TR tube would have to be altered so that it is matched to the characteristic impedance of this reduced height waveguide. In a test where one ATR tube resonated at 2750 mc. on a normal waveguide, the ATR tube was found to resonate at 2950 mc. when mounted on the half-height waveguide.

The discussion thus far has dealt with reduction of impedance by reducing the waveguide height. However, the reduction in impedance where waveguide is used can be accomplished by means other than the reduction in waveguide height. For instance, a waveguide of standard height may be reduced in impedance by filling all or part of it with material having a higher dielectric constant than air. This would also eliminate one of the chief disadvantages of the waveguide height reduction method, namely, the reduction in peak power handling capabilities.

An embodiment of this form of the invention is shown in Figure 5 wherein a waveguide circuit comprising sections $3_c$, $5_c$ and $7_c$ couple the output of transmitter 14 to antenna 12. A waveguide branch comprising section $3_c$, a portion of $5_c$ and $10_c$, in series with TR tube 1 couples antenna 12 to receiver 13. ATR tube 2 is coupled to section $5_c$, and TR tube 1 is coupled between sections $5_c$ and $10_c$. $4_c$ and $6_c$ are tapered dielectric surfaces providing matching transition means between sections $3_c$, $5_c$ and $7_c$. Sections $3_c$ and $7_c$ are standard height hollow waveguide sections having characteristic impedances of $Z_o$. Sections $5_c$ and $10_c$ are dielectric filled standard height waveguide sections having a characteristic impedance less than $Z_o$ by an amount depending on the dielectric used. The width and height dimensions of the waveguide will be determined by the considerations mentioned above.

Since the impedances of sections $5_c$ and $10_c$ are reduced to a value less than $Z_o$, the $Q_L$ of the TR and ATR tubes will be reduced a corresponding amount, and the bandwidth of the duplexing system will be increased a corresponding amount.

Figure 6 is a modification of Fig. 2 wherein two (or more) ATR tubes 2 are placed on the reduced impedance waveguide section $5_d$, and each two adjacent ATR tubes are separated from each other by one-half a waveguide wavelength. The remainder of the waveguide sections in this embodiment of the invention perform the same function as similarly numbered sections in Fig. 2. The use of two ATR tubes, as here shown, will approximately double the duplexer bandwidth over the bandwidth obtainable with one ATR tube on the reduced height section.

Fig. 7 is a modification of Fig. 3 two ATR tubes 2 are placed on the reduced height waveguide section $5_e$, and are separated by one-half a waveguide wavelength. The remainder of the waveguide sections perform the same functions as similarly numbered sections described for Fig. 3. The duplexer bandwidth is accordingly increased as described above.

Figure 8 is an embodiment of the invention wherein the TR tube 1 and the ATR tube 2 are shunt mounted on the waveguide sections. Only the ATR 2 tube is on the reduced impedance section $5_f$, and it is separated from the TR tube 1 by one-half a waveguide wavelength. The remainder of the waveguide sections perform the identical function as similarly numbered sections described for Fig. 3.

Fig. 9 is a modification of Fig. 8 where two ATR tubes 2 are placed on the reduced impedance section $5_g$ and are separated by one-half a waveguide wavelength. The use of two ATR tubes 2 on the reduced impedance section $5_g$ will approximately double the duplexer bandwidth that is obtainable with just one ATR tube. This arrangement may be used when the desired bandwidth increase cannot be obtained with just one ATR tube on the reduced height section.

Fig. 10 is a modification of Fig. 2 wherein both the TR tube 1 and ATR tube 2 are shunt mounted on the reduced impedance section $5_h$, and are separated by one-half a waveguide wavelength.

Fig. 11 is a modification of Fig. 10 wherein more than one ATR tubes 2 are placed opposite each other on the reduced impedance section $5_i$, and are separated from the TR tube by one-half a waveguide wavelength. This arrangement increases the duplexer bandwidth as described above.

Fig. 12 is another modification of Fig. 3 showing a combination shunt-series mounting wherein the ATR tube 2 is shunt mounted on the reduced impedance section $5_j$, and the TR tube 1 is series mounted on the normal impedance waveguide section $3_j$, and is separated from the ATR tube 2 by one-half a waveguide wavelength.

Figure 13:
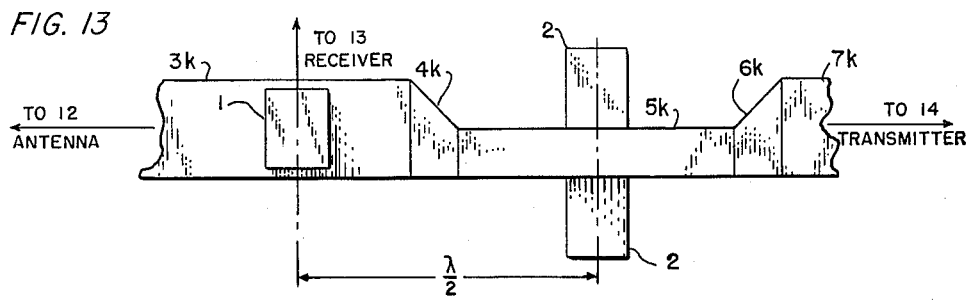

Fig. 13 is a modified arrangement of Fig. 12 wherein two ATR tubes 2 are series mounted opposite each other on the reduced impedance section $5_k$. This arrangement will approximately double the duplexer bandwidth of the arrangement in Fig. 12 for reasons stated above.

Figure 14:
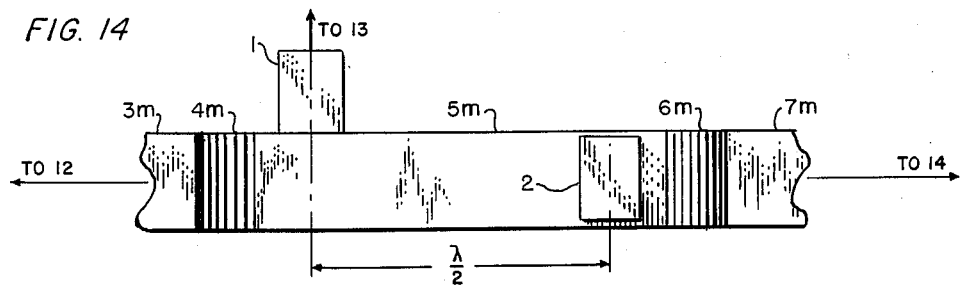

Fig. 14 is a further modification of Fig. 2 showing a combination series-shunt mounting wherein ATR tube 2 is series mounted on the reduced impedance section $5_m$, and TR tube 1 is shunt mounted on said reduced impedance section, and is separated from said ATR tube 2 by one-half a waveguide wavelength.

Figure 15:
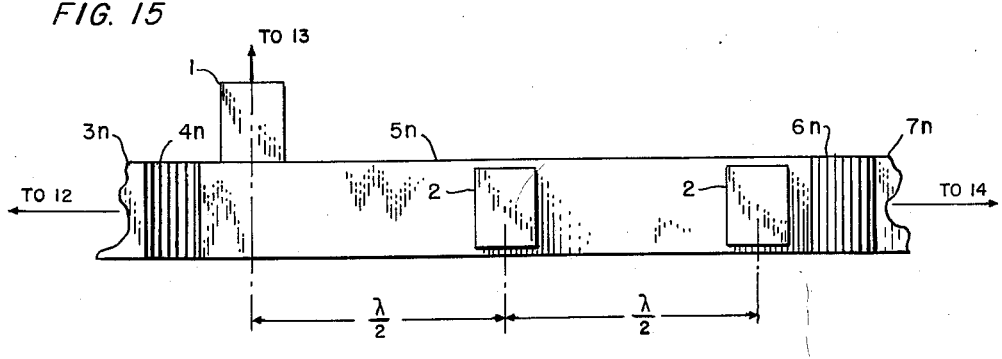

Fig. 15 is a modification of Fig. 14 where more than one ATR tubes 2 are series mounted on reduced impedance section $5_n$, and are separated from each other by one-half a waveguide wavelength. TR tube 1 is shunt mounted on said reduced impedance section, and is separated from the closest ATR tube by one-half a waveguide wavelength. This arrangement will increase the duplexer bandwidth as explained above.

In actual tests performed on the invention using hollow rectangular waveguide sections and a series mounted 1B44 type of ATR tube, the following values were used to obtain the desired results: The outside dimensions of the waveguide were 3 inches wide, the standard height H was 1.5 inches, and the reduced height $$\frac{H}{2}$$

was .75 inch; the walls of the waveguide were .08 inch thick; the transmitter operating frequency was 2750 megacycles, and the waveguide wavelength was approximately 6.13 inches; the characteristic impedance of the standard height section H was approximately 400 ohms, and the characteristic impedance of the reduced height section $$\frac{H}{2}$$

was approximately 200 ohms.

The above values satisfactorily produced the predicted results. In actual practice they may vary, and approximate values will also give satisfactory operation.

While there have been described what are at present considered to be preferred embodiments of the invention, it will be obvious to those skilled in the art that various changes and modifications may be made therein without departing from the invention, and it is therefore the aim of the appended claims to cover all such changes and modifications as fall within the true spirit and scope of the invention.

What is claimed is:

1. In combination with a signaling system including a transmitter and receiver respectively operating to transmit and receive useful signals in the same frequency band, a common transmitting and receiving antenna and transmission means interconnecting said transmitter and receiver with said antenna: duplexing means coupled to said transmission means for protecting said receiver against high amplitude outgoing signal energy and for causing substantially all of the incoming useful signal energy to be delivered to said receiver, said duplexing means comprising a transmit-receive switch and at least one anti-transmit-receive switch all of the resonant-cavity discharge tube type and the resonant cavities of which are tuned to frequencies within said same frequency band, the said switches being adapted to be short-circuited in response to high amplitude outgoing signal energy of the resonant frequency; and means for increasing the effective bandwidth of said duplexing means comprising means for reducing the characteristic impedance of an intermediate portion of said transmission means with respect to the other portions thereof and means for coupling the resonant cavity of at least each anti-transmit-receive switch directly to said intermediate portion of the transmission means so that the loading effect of that portion on the tuned resonant cavities coupled thereto reduces the power loss introduced by each anti-transmit-receive switch and its associated circuitry in the transmission of the incoming useful signals in said same frequency band from said antenna to said receiver and tending to limit the effective bandwidth of said transmit-receive switch.

2. In a signaling system including a pulse transmitter and a pulse receiver respectively operating to transmit and receive useful signals in the same frequency band, a common transmitting and receiving antenna and transmission means interconnecting said transmitter, receiver and antenna, including a first section connected to said antenna, a second section connected to said transmitter, a third section connected to said receiver and a fourth, intermediate, section connected in series with said first and second sections and having a characteristic impedance to the principal mode of the useful signals in said frequency band propagated therethrough which is lower than that of the other sections of said transmission means to these signals, duplexing means for conditioning said system alternately for signal transmission and reception comprising an anti-transmit-receive switch and a transmit-receive switch both of the resonant-cavity discharge tube type and the resonant cavities of which are tuned to frequencies in said same frequency band, the tuned resonant cavity of said anti-transmit-receive switch being directly coupled to said fourth, lower impedance section of said transmission means and the resonant cavity of said transmit-receive switch being coupled between said first and said second and third sections of said transmission means, the impedance of said transmit-receive switch being matched to the impedance of the sections of said transmission means to which it is connected.

3. In a signaling system comprising a pulse transmitter for transmitting high power signals of frequencies within a given frequency band, an antenna and a receiver for receiving relatively low power signals of frequencies within said given frequency band: a first transmission means coupled to the transmitter, a second transmission means coupled to said antenna, a third transmission means of a reduced characteristic impedance with respect to said first and said second transmission means, having one end coupled to said first transmission means and its other end coupled to said second transmission means, and a duplexing means comprising a transmit-receive switch and at least one anti-transmit-receive switch of the resonant-cavity discharge tube type, having their resonant cavities tuned to frequencies within said given frequency band and directly coupled to said third transmission means, said transmit-receive switch being separated from the closest anti-transmit-receive switch by an integral number of quarter-wavelengths, and said receiver being coupled to the output of the resonant cavity of said transmit-receive switch.

4. In combination with a signaling system including a pulse transmitter and pulse receiver operating in the same useful signal frequency band, an antenna and transmission means interconnecting said antenna with said transmitter and said receiver; means for reducing the characteristic impedance of an intermediate portion of said transmission means to the signals within said frequency band in a desired mode propagated thereover, with respect to the other portions of said transmission means and duplexing means for conditioning said system alternately for signal transmission and reception including a transmit-receive switch and an anti-transmit-receive switch both of the resonant-cavity discharge tube type and tuned to frequencies in said same band, said transmit-receive switch and said anti-transmit-receive switch being adapted to allow substantially all of the low-power incoming signal energy to be transmitted to said receiver during signal receiving intervals and to be short-circuited in response to the relatively high-power outgoing signal energy to allow transmission of that energy to said intenna and block it from said receiver during signal transmitting intervals, the tuned resonant cavity of said anti-transmit-receive switch being coupled directly to said intermediate portion of said transmission means and the tuned resonant cavity of said transmit-receive switch being connected between the portions of the transmission means directly connected to said antenna and said receiver, the loading effect of the intermediate reduced-impedance portion of said transmission means on the tuned resonant cavity of said anti-transmit-receive switch coupled thereto serving to reduce the edge-band branching losses introduced by that switch and its associated circuitry in the transmission of the incoming signal energy from said antenna to said receiver, which losses tend to reduce the effective bandwidth of said transmit-receive switch.

5. In combination with a signaling system including a pulse transmitter and receiver operating in the same useful signal frequency band, an antenna and transmission means interconnecting said antenna with said transmitter and receiver: means for reducing the characteristic impedance of an intermediate portion only of said transmission means to useful signals in said frequency band in a desired mode propagated thereover and duplexing coupled to said transmission means comprising a transmit-receive resonant switching tube and an anti-transmit-receive resonant switching tube both tuned to frequencies in said band, at least said anti-transmit-receive resonant tube being directly coupled to said reduced characteristic impedance portion so that the effective operating bandwidth of that tube is increased by the resulting loading effect thereon.

6. In a signal wave transmission system including a transmitter and a receiver respectively operating to transmit and receive useful signals in the same frequency band and a common transmitting and receiving antenna, transmission means interconnecting said antenna with said transmitter and receiver, made from rectangular waveguide and having an intermediate portion only of reduced characteristic impedance, and duplexing means for alternately conditioning said system for signal transmitting and receiving including a transmit-receive switch and an anti-transmit-receive switch both of the resonant-cavity discharge tube type, the resonant cavities of both said switches being tuned to frequencies in said same band and the resonant cavity of at least said anti-transmit-receive switch being coupled directly to said intermediate portion of said transmission means.

7. A wave transmission system as set forth in claim 6, wherein the ratio of height to width of said intermediate portion of said waveguide is less than that of the remainder of said waveguide.

8. A wave transmission system as set forth in claim 6, wherein the width of said waveguide is constant and the height of said intermediate portion thereof is less than that of the remainder of said waveguide.

9. A signaling system comprising a pulse transmitter and a pulse receiver respectively operative to transmit and receive useful signals within the same frequency band; a common transmitting and receiving antenna; transmission means for interconnecting said transmitter and receiver with said antenna, comprising a first section connected to the transmitter, a second section connected to the antenna and an intermediate section of reduced characteristic impedance with respect to the other sections, connecting said first and said second sections; and duplexing means including a transmit-receive resonant tube and an anti-transmit-receive resonant tube both tuned to frequencies in said same useful signal frequency band, and operating as automatic switches for respectively protecting said receiver against the relatively high power outgoing signal energy during signal transmitting intervals and directing substantially all of the low power incoming signal energy to said receiver during signal receiving intervals, at least said anti-transmit-receive tube being directly coupled to the intermediate section of said transmission means so that the loading effect of that section effectively increases the operating bandwidth of the resonant element of said anti-transmit-receive tube and thus effectively reduces the edge-band losses introduced by that tube and its associated circuitry in the incoming signal energy in transmission from said antenna to said receiver.

References Cited in the file of this patent
UNITED STATES PATENTS

| | | |
|---|---|---|
| 2,484,798 | Bradley | Oct. 11, 1949 |
| 2,485,606 | Kandoian | Oct. 25, 1949 |
| 2,633,493 | Cohn | Mar. 31, 1953 |
| 2,656,515 | Hansen | Oct. 20, 1953 |
| 2,693,583 | Rigrod | Nov. 2, 1954 |
| 2,773,978 | Friis | Dec. 11, 1956 |